US 12,280,355 B2

(12) United States Patent
Hukelmann

(10) Patent No.: US 12,280,355 B2
(45) Date of Patent: Apr. 22, 2025

(54) DEVICE AND PROCESS FOR THE PRODUCTION OF FINE FAT PARTICLES

(71) Applicant: Deutsches Institut für Lebensmitteltechnik e.V., Quakenbrück (DE)

(72) Inventor: Bernhard Hukelmann, Quakenbrück (DE)

(73) Assignee: Deutsches Institut für Lebensmitteltechnik e.V., Quakenbrück (DE)

( * ) Notice: Subject to any disclaimer, the term of this patent is extended or adjusted under 35 U.S.C. 154(b) by 667 days.

(21) Appl. No.: 17/428,460

(22) PCT Filed: Feb. 3, 2020

(86) PCT No.: PCT/EP2020/052629
§ 371 (c)(1),
(2) Date: Aug. 4, 2021

(87) PCT Pub. No.: WO2020/161078
PCT Pub. Date: Aug. 13, 2020

(65) Prior Publication Data
US 2022/0105484 A1    Apr. 7, 2022

(30) Foreign Application Priority Data
Feb. 5, 2019    (DE) .......................... 102019201472.0

(51) Int. Cl.
*B01J 2/04*    (2006.01)
*A23D 9/05*    (2006.01)
(Continued)

(52) U.S. Cl.
CPC .................. *B01J 2/04* (2013.01); *A23D 9/05* (2013.01); *B05B 7/0087* (2013.01); *B05B 7/168* (2013.01); *B05B 7/2491* (2013.01); *B05B 9/005* (2013.01)

(58) Field of Classification Search
CPC .................. A23D 9/05; B29B 9/10; B01J 2/04
See application file for complete search history.

(56) References Cited

U.S. PATENT DOCUMENTS

| 4,822,267 A | 4/1989 | Walz |
| 4,952,224 A | 8/1990 | Lilakos |

(Continued)

FOREIGN PATENT DOCUMENTS

| DE | 1692523 B1 | 1/1972 |
| DE | 10340606 A1 | 3/2005 |
| EP | 0444767 A2 | 9/1991 |

OTHER PUBLICATIONS

International Search Report and Written Opinion from the corresponding International Patent Application No. PCT/EP2020/052629, dated Jun. 3, 2020.

*Primary Examiner* — Vera Stulii
(74) *Attorney, Agent, or Firm* — Greer, Burns & Crain, Ltd; Steven P. Fallon

(57) ABSTRACT

A device and to a process which can be carried out using the device, for the production of fine particles from a liquid which solidifies upon cooling, in particular from liquid fat. The process has the advantage of producing fine particles of very small size, preferably with narrow size distribution. The device has the advantage that a solidifying liquid can be supplied at a temperature above its solidification temperature, without cooling gas leading to solidification of the liquid in the supply line, which cooling gas is used in the production of the particles.

11 Claims, 2 Drawing Sheets

Figure 1:
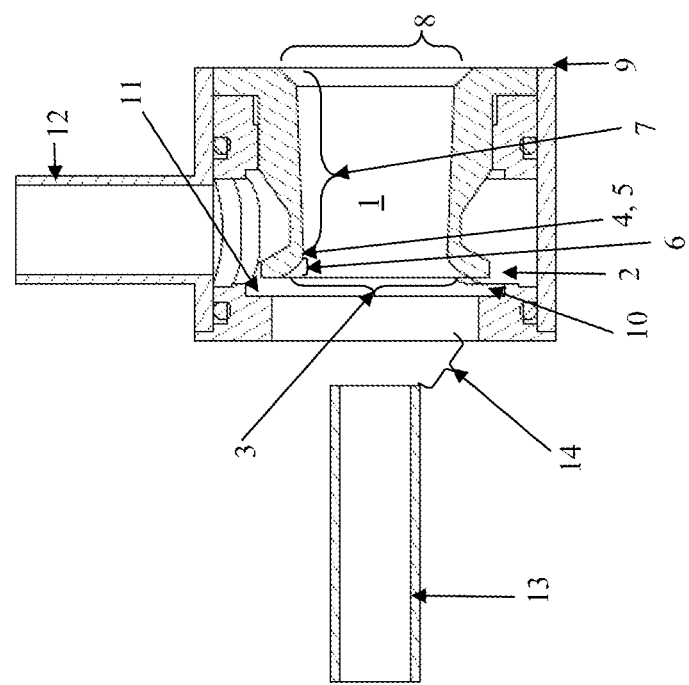

(51) Int. Cl.
    *B05B 7/00*     (2006.01)
    *B05B 7/16*     (2006.01)
    *B05B 7/24*     (2006.01)
    *B05B 9/00*     (2006.01)

(56) References Cited

U.S. PATENT DOCUMENTS

| | | |
|---|---|---|
| 2002/0176919 A1 | 11/2002 | Baumer et al. |
| 2006/0280855 A1 | 12/2006 | Van Den Berg et al. |
| 2014/0000297 A1 | 1/2014 | Wieland |
| 2015/0118383 A1 | 4/2015 | van den Berg et al. |
| 2016/0318105 A1 | 11/2016 | Gerking et al. |

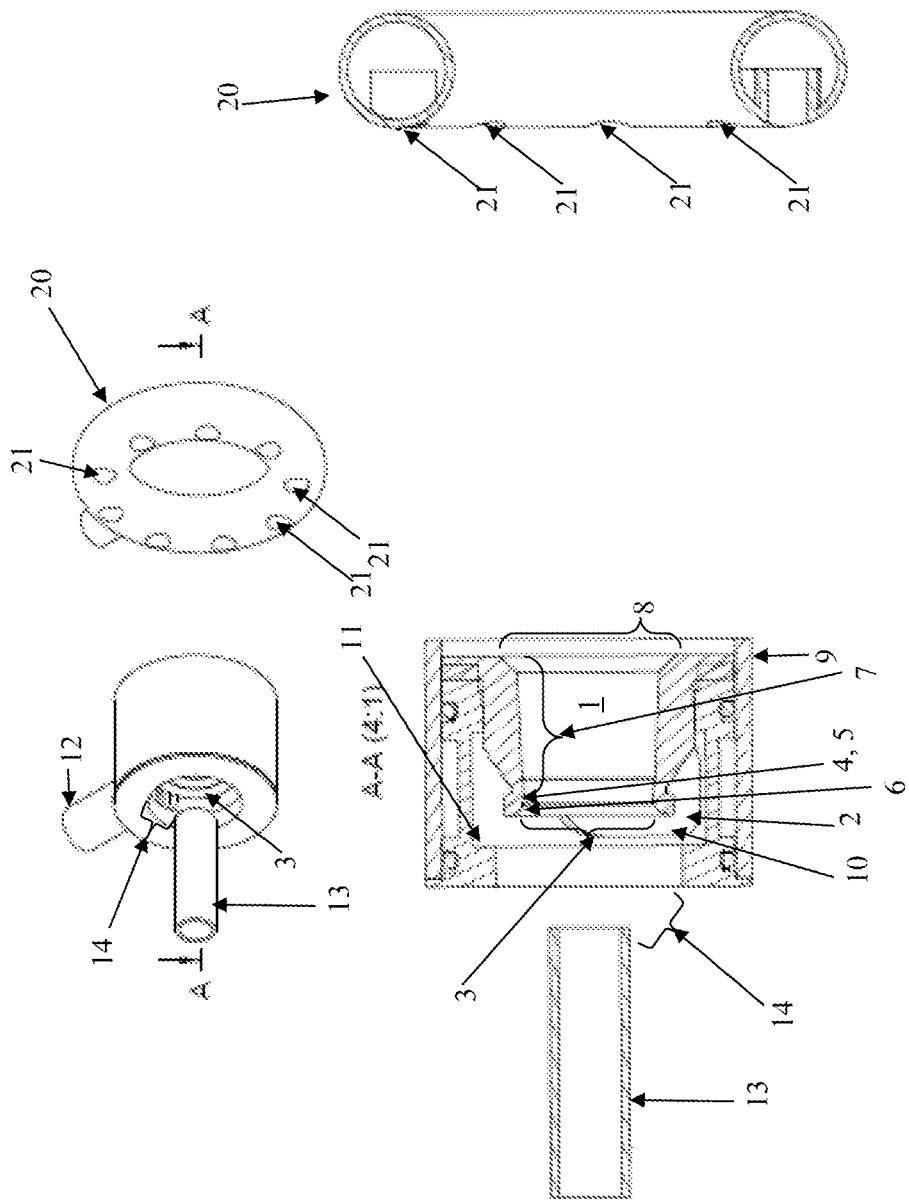

DEVICE AND PROCESS FOR THE PRODUCTION OF FINE FAT PARTICLES

The present invention relates to a device and to a process, which can especially be carried out by use of the device, for the production of fine particles from a liquid which solidifies upon cooling, in particular from liquid fat which has a temperature above its solidification temperature and which solidifies upon cooling.

The process has the advantage of producing fine particles of very small size, preferably with a narrow size distribution. The device has the advantage that a solidifying liquid can be supplied at a temperature above its solidification temperature without cooling gas resulting in solidification of the liquid in the supply line, which cooling gas is used in the generation of the particles. By means of a cooling gas which is introduced into a nozzle as a propellant gas, and preferably by subsequently introducing the mixture of the liquid and propellant gas, or resp. of fat and propellant gas, which mixture exits from a nozzle, into a space with cooled gas, the liquid is solidified, forming fine particles. Therein, the propellant gas has a temperature below the solidification temperature of the liquid or of the fat.

STATE OF THE ART

U.S. Pat. No. 4,952,224 A for the production of fat particles describes the spraying of hot liquid fat through a heated Venturi nozzle and the subsequent blowing onto the spray jet in the same direction of its movement, with nitrogen or carbon dioxide as a cooling gas.

OBJECT OF THE INVENTION

The invention has the object to provide an alternative device and an alternative process for the production of fine particles from a liquid which solidifies upon cooling. The device and process shall especially be suitable for the production of fine particles with a narrow size distribution and without larger droplets.

DESCRIPTION OF THE INVENTION

The invention achieves the object by the features of the claims and in particular by means of a process and by a device having a nozzle, to the inlet opening of which nozzle, which inlet opening is arranged at the first end, a propellant gas supply line is connected, and to the inlet opening of which nozzle a supply line discharges for the liquid, which is in particular liquid fat. The supply line preferably discharges in the area of the nozzle in which negative pressure is generated upon application of propellant gas onto the propellant gas supply line. The propellant gas supply line can be formed in the form of at least 2 or at least 3, more preferably at least 8 lines which are distributed around the longitudinal axis of the nozzle, even more preferably by an annular mouth of the supply line.

The nozzle has a central channel which at its first end forms an inlet opening which is spanned open by a convex face about the longitudinal axis of the central channel, and at its opposite second end forms an outlet opening. Generally, the central channel, which is spanned open by the face that is convex to the longitudinal axis, tapers from the inlet opening to a section in which the central channel has the smallest radius. The convex face preferably extends rotationally symmetrically about the longitudinal axis of the central channel and particularly preferably has a convex surface which extends radially about the longitudinal axis of the central channel, wherein the surface can e.g. be parabolic, the slope of which surface increases in the direction towards the longitudinal axis of the central channel, i.e. the slope of which surface increases with decreasing radius to form a curvature which is increasing towards the longitudinal axis. The nozzle can extend only over a first section between the inlet opening and its smallest radius, such that the nozzle terminates in its smallest radius, respectively such that the central channel terminates in its smallest radius and spans open the outlet opening. In this embodiment, the nozzle is a non-extended nozzle.

Alternatively and preferably, the central channel of the nozzle adjacent to its first section adjacent to its smallest radius has a second section which widens from this smallest radius in the direction towards the outlet opening, preferably with a conically increasing cross-section. Therein, the second section can span open the outlet opening e.g. maximally up to a distance from the section of the smallest radius, in which no jet separation from the central channel occurs. The second section can e.g. have a length that is the length of the first section along the longitudinal axis by a factor of 0.2 or 0.5 or 0.6 to a maximum of a factor of 2 or 1.6 or 1. In this embodiment, the nozzle is a Laval nozzle, the second section of which discharges into the outlet opening within or ahead of the area of the jet separation.

In cooperation with the increasing diameter of the central channel in the section which is adjacent to its section having the smallest radius adjacent to the convex face, a negative pressure is generated which acts as far as into the inlet opening, more preferably into the plane in which the propellant gas supply line opens.

The propellant gas supply line is arranged to allow propellant gas to flow out into the inlet opening approximately in parallel to the surface of the central channel, so that the propellant gas supply line is set up to allow compressed air flowing radially with respect to the longitudinal axis of the central channel to flow against the surface.

Preferably, the propellant gas supply line forms an annular supply line having an annular opening at the inlet opening of the central channel. Therein, the annular opening of the supply line is limited by the surface of the central channel, which surface spans open the inlet opening of the central channel. At a distance from the surface of the central channel, the annular opening is formed e.g. by a shoulder that is spaced from the convex face so that the cross-section of the annular opening is arranged in a section adjacent to the inlet opening of the central channel, wherein the inlet opening directly abuts to the inlet opening or is spaced by an axial section of the longitudinal axis of the central channel. The shoulder is preferably annular so that it forms, together with the spaced convex face spanning open the inlet opening, an annular opening of the propellant gas supply line about the longitudinal axis of the central channel.

Connected to the propellant gas supply line is a source of propellant gas, which is preferably propellant gas that is cooled to a temperature of at least 50 K below, more preferably at least 100 K below the solidification temperature of the liquid, especially below the solidification temperature of the liquid fat, e.g. a container for cooled propellant gas, e.g. for liquid nitrogen or for gaseous nitrogen that is produced directly from liquid nitrogen, or a compressor and a cooling device for propellant gas.

The propellant gas that enters the nozzle is cooled, especially to a temperature of at least 50 K or at least 100 K below the solidification temperature of the liquid fat. The propellant gas can e.g. have a temperature of −60° C. to −90°

C. for palm fat or coconut fat as a liquid fat that can e.g. have a temperature of 40° C. to 50° C.

Surprisingly, it has shown that propellant gas, which is used in spraying liquid fat and which has a temperature of at least 50 K or at least 100 K below the solidification temperature of the liquid fat, leads to the production of fine particles, and that no or no disturbing deposits of the fat occur in the nozzle, which is in particular a Laval nozzle. Optionally, the nozzle is heated. Therein, it has shown that heating the nozzle has little or no impairing effect on the production of fine fat particles when the propellant gas is at least 50 K or at least 100 K colder than the solidification temperature of the fat.

Generally, the mouth of the liquid supply line can be located in an area in which the nozzle generates a negative pressure relative to the ambient pressure or relative to the pressure of the propellant gas upon application of propellant gas to the propellant gas supply line. This area in which negative pressure is generated can extend from a distance from the inlet opening to the area with the smallest radius of the central channel, or can extend from the area in which the propellant gas supply line discharges up to the area of the inlet opening of the central channel or up to the area of the smallest radius of the central channel.

The arrangement of the propellant gas supply line such that it opens radially to the longitudinal axis of the central channel at the inlet opening, in particular in an annular opening, guides the propellant gas along the surface of the central channel and generates a gas flow longitudinally along the central channel. At its first end, the nozzle can be open to the environment and can form an supply air opening, such that gas from the environment can be drawn into the inlet opening through the supply air opening. Between the liquid supply line and the central channel, the nozzle can e.g. have a supply air opening that is open to the environment. Optionally, gas, e.g. propellant gas which is recirculated after flowing out of the outlet opening, can be guided to the supply air opening. This embodiment has the advantage that the propellant gas draws in gas from the surroundings through the supply air opening and the gas volume flow through the nozzle is amplified at the same volume flow of the propellant gas. Optionally, gas which is supplied to the supply air opening can be temperature-controlled to a temperature between room temperature and the temperature that the liquid has in its supply line, or above its solidification temperature. Preferably, the device generally has a cooling device for cooling the gas which is supplied to the supply air opening, e.g. to the temperature of the propellant gas which is supplied to the nozzle, e.g. −90 to −60° C. The gas which is supplied to the supply air opening, e.g. via a conduit, can be recirculated propellant gas which has flowed out of the nozzle, and preferably after separation of particles, e.g. via a cyclone, a membrane, or a deep-bed filter.

Alternatively, the nozzle can be closed between the propellant gas supply line and the liquid supply line, so that only the propellant gas supply line and the liquid supply line are connected to the inlet opening, respectively the nozzle has no supply air opening.

The propellant gas preferably is cooled gas, preferably inert gas, e.g. nitrogen and/or $CO_2$. The propellant gas is cooled to a temperature, determined after the exit from the propellant gas supply line, which temperature is sufficient to cool the liquid to a temperature below its solidification temperature. Preferably, the propellant gas is cooled to a temperature of at least 50 K, preferably of at least 75 K or of at least 100 K, preferably of at least 150 K below the temperature of the liquid in the liquid supply line, or below the solidification temperature of the liquid. Particularly preferably, the propellant gas is nitrogen having a temperature of −196° C. to −60° C., which is e.g. produced by immediately preceding evaporation of liquid nitrogen.

The liquid has a temperature above its solidification temperature, e.g. 10 K to 100 K, or 20 to 50 K above its solidification temperature at ambient pressure.

It has shown that supplying the liquid into the area of the nozzle where negative pressure is generated by inflowing propellant gas results in intensive mixing of the liquid fat with the colder propellant gas and in the formation of fine droplets that can solidify into particles.

Preferably, the supply line for the liquid fat is heatable, e.g. is heated continuously or in a controlled manner only at the beginning of the process, is not heated during the process and/or is heated only at the end of the process, in order to avoid solidification of the liquid in the supply line.

Optionally, the nozzle can be heatable, e.g. in the area extending between its inlet opening and the area of the smallest radius, and/or in the optional area extending between the area of the smallest radius and the outlet opening, e.g. heatable to a temperature above the solidification temperature of the liquid fat and e.g. below the vaporization temperature of the liquid fat. For fats which are solid at room temperature, the nozzle and/or the supply line can e.g. be heated to 150 to 250° C., e.g. to 180 to 220° C., e.g. to 200° C. A heatable nozzle has the advantage of liquefying or vaporizing fat which is deposited on the central channel during the process, so that this fat is subsequently cooled to particles by the propellant gas. The nozzle and/or the liquid supply line can be heatable in that it contains, on or in its wall, electrical heating elements or channels for the passage of a heat transfer medium.

The nozzle discharges into a gas space which has a temperature below the solidification temperature of the liquid, which preferably is liquid fat, e.g. a temperature of at least 50 K, preferably at least 75 K or at least 100 K, preferably at least 150 K or at least 200 K, below the solidification temperature of the liquid. This is because it has shown that the nozzle disperses the liquid into fine droplets which then solidify in the gas space at a lower temperature. This dispersion of the liquid into fine droplets is currently attributed to the propellant gas causing effective shearing of the liquid in the nozzle, which is preferably a Laval nozzle, while at the same time the colder propellant gas leads to the expansion of the liquid fat and to the prevention of subsequent coalescence.

Therein, the inlet opening of the nozzle can be arranged outside of this gas space. Preferably, the propellant gas is cooled, e.g. to a temperature of at least 50 K, preferably at least 75 K or at least 100 K, preferably at least 150 K or at least 200 K below the solidification temperature of the liquid. Therein, the nozzle can draw in gas from the environment through its inlet opening 3 or through the supply air opening 14, which gas is cooled by mixing with the propellant gas.

In a preferred embodiment, the device has a counterflow unit that is set up to direct a gas flow against the gas flow exiting from the outlet opening of the nozzle. A counterflow unit can direct the gas flow, which can be a single gas flow or which can have at least two partial flows, frontally or at an angle of e.g. 90° to 180° onto the gas flow exiting from the nozzle. The counterflow unit preferably supplies cooled gas, e.g. cooled at a temperature, which is determined after the exit from the counterflow unit, of at least 50 K, preferably at least 75 K or at least 100 K, preferably at least 150

K below the temperature of the liquid in the liquid supply line, or below the solidification temperature of the liquid.

The counterflow unit generates a counterflow of cooled gas, which counterflow can consist of one counterflow or of at least two partial counterflows, e.g. directed at an angle of 90° to 180° against the gas flow exiting from the nozzle. Therein, the gas flow exiting from the nozzle has particles and preferably has droplets of liquid not yet solidified, in particular of liquid fat not yet solidified. Generally, the counterflow unit can be connected to a supply line that conducts cooled propellant gas which is taken from the gas flow exiting from the nozzle, preferably after compression and cooling.

In the process, the counterflow unit generates at least one gas flow which is directed against the gas flow exiting from the nozzle. It has shown that a process in which cooled gas from a counterflow unit is directed in counterflow against the gas flow exiting from the nozzle results in the production of smaller particles and/or in the production of particles of a narrower size distribution from the liquid, in particular from liquid fat. Currently, it is assumed that the at least one cooled gas flow, which is directed from the counterflow unit towards the gas flow exiting from the nozzle, leads to the shearing of liquid droplets and to the vaporization of liquid droplets with formation of smaller particles and/or with a narrower size distribution of particles than the process without counterflow.

Preferably, in the process, particles, in particular of fat, are produced by cooling from a liquid, in particular from liquid fat, which liquid has a temperature above its solidification temperature, wherein the liquid is passed through a supply line into the area of the nozzle in which negative pressure is generated, while propellant gas is guided through the propellant gas supply line to the inlet opening of the nozzle, wherein the propellant gas is cooled, e.g. having a temperature of at least 50 K, preferably at least 100 K below the solidification temperature, with flowing through the central channel of the nozzle, which tapers to a section of smallest radius, and discharging of the propellant gas, which is in admixture with the cooled liquid, from an outlet opening of the nozzle, which outlet opening lies opposite to the inlet opening, and separation of particles from the propellant gas. The particles are therefore formed from the liquid that has solidified by cooling, optionally with propellant gas enclosed, or the particles consist of the liquid that has solidified by cooling.

The liquid is e.g. fat, in particular palm fat, coconut fat or another plant-based fat.

Preferably, the nozzle is vertical with its outlet opening directed upward, a counterflow unit is preferably directed against the outlet opening.

Figure 2:
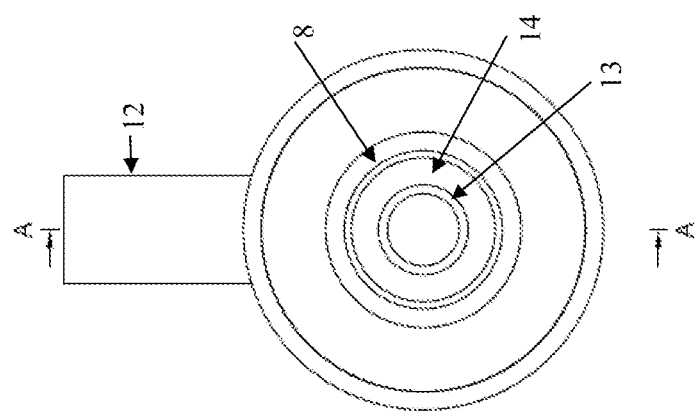

The invention is now described in more detail with reference to the Figures, which schematically show In FIG. 1 an embodiment of the device according to the invention in top view onto the outlet opening, In FIG. 2 the embodiment of FIG. 1 in section A-A, In FIG. 3 an embodiment in perspective top view, and In FIG. 4 the embodiment of FIG. 3 in section A-A.

FIGS. 1 to 4 show a nozzle having a rotationally symmetrical central channel 1 that tapers from an inlet opening 3, which is arranged at the first end 2, to a section 4 having the smallest radius 5 of the central channel 1. In the embodiment shown, the central channel 1 has a first section 6 which extends from the inlet opening 3 to the section 4 having the smallest radius 5, and has an adjacent second section 7 in which the central channel 1 widens from the section 4 having the smallest radius 5 to the outlet opening 8 which is spanned open by the central channel 1 at the second end 9. The central channel has a face that is convex to its longitudinal axis.

At the first end 2 of the central channel 1, an annular opening 10 is formed between the inlet opening 3 and an annular shoulder 11. A propellant gas supply line 12 is connected to the annular opening 10 for supplying propellant gas. Optionally, the propellant gas supply line 12 can be supplied with recirculated propellant gas which is drawn from the gas exiting from the nozzle, e.g. by means of a compressor (not shown), wherein e.g. particles are separated from the gas by means of a separating device (not shown), and the gas is cooled by means of a cooling device (not shown). Alternatively, the propellant gas can generally come from a pressure vessel (not shown).

A supply line 13 for directing the liquid into the nozzle discharges in the area of the nozzle in which negative pressure is generated by the propellant gas, in this case at a short distance in front of the plane of the annular opening 10 or resp. in front of the inlet opening 3. The supply line 13 can be heatable, e.g. electrically, by means of a controlled heater (not shown).

In the embodiment shown here, the distance between the supply line 16 for the liquid and the annular shoulder 11, which limits the annular opening 10, forms a supply air opening 14 through which gas from the surroundings can be drawn into the nozzle. Therein, recirculated propellant gas can be directed to the supply air opening 14 by means of a conduit (not shown), alternatively, the supply air opening can be closed or can be accessible only to a connected conduit (not shown) that supplies recirculated propellant gas.

In accordance with a preferred embodiment, FIGS. 3 and 4 show a counterflow unit 20 which, by way of example, allows 4 partial flows to exit from outlets 21, which are directed against the gas flow exiting from the outlet opening 8. Preferably, a conduit leads propellant gas, which is extracted from the gas flow exiting from the nozzle, to the counterflow unit 20 after separation of particles, preferably after passing through a compressor and a cooling device.

EXAMPLE

Production of Fine Fat Particles from Liquid Fat

As a representative of a liquid, coconut fat at a temperature of 80 to 90° C. was directed through a supply line of a device that generally corresponded to FIGS. 3 and 4. As a propellant gas, nitrogen, immediately after the evaporation of liquid nitrogen, was directed through the annular opening 10 and was flowed along the convex face of the central channel 1 to the inlet opening 3. The gaseous nitrogen which was used as propellant gas had a temperature of about −60 to −90° C. The outlet opening could be open to the surroundings. Particles of fat having a small particle size were produced. The supply line was heated to approx. 90 to 100° C.

To prevent deposits of the fat within the nozzle, this was heated to about 200° C.

Additionally, in one variant, nitrogen, also immediately after the evaporation of liquid nitrogen, was directed through a single outlet 21, in perpendicular against the outlet opening 8 of the nozzle. The outlet 21 was arranged at a distance of approx. 1 to 5 cm from the outlet opening 8.

REFERENCE NUMERAL

1 central channel
2 first end
3 inlet opening
4 section
5 smallest radius
6 first section
7 second section
8 outlet opening
9 second end
10 annular opening
11 annular shoulder
12 propellant gas supply line
13 liquid supply line
14 supply air opening
20 counterflow unit
21 outlet

The invention claimed is:

1. A process for producing particles from liquid fat having a temperature above its solidification temperature, comprising:

conducting liquid fat through a supply line to discharge to an inlet of a nozzle and into an area of a central channel of the nozzle directing propellant gas into the area of the central channel via an annular opening formed between the inlet and an annular shoulder of the nozzle to create a negative pressure, wherein the central channel tapers to a section of smallest radius at the area and comprises a second section that widens to an outlet opening at an opposite end of the nozzle from the inlet, wherein the propellant gas has a temperature of at least 50 K below the solidification temperature of the liquid fat, directing a counterflow of cooling gas into the central channel to cool the liquid fat while it is in the central channel, wherein the cooling gas has a temperature of at least 50 K below the solidification temperature of the liquid fat, discharging a mixture of the propellant gas with the liquid fat from the outlet opening of the nozzle, subsequent cooling of the mixture of the propellant gas with the fat, and separating particles from the propellant gas to obtain the particles.

2. The process according to claim 1, wherein the central channel comprise a convex face that extends to the inlet, extends radially about the longitudinal axis of the central channel and extends symmetrically around the longitudinal axis of the central channel.

3. The process according to claim 1, wherein the propellant gas is directed from an annular supply line into the annular opening.

4. The process according to claim 1, comprising recycling the propellant gas after the separating the particles, wherein the recycling comprises compressing, cooling and recirculating the propellant gas.

5. The process according claim 1, comprising recycling the cooling gas after the separating the particles, wherein the recycling comprises compressing, cooling and recirculating the cooling gas.

6. The process according to claim 1, wherein the propellant gas and/or the cooling gas has a temperature of at least 75 K below the solidification temperature of the fat.

7. The process according to claim 1, wherein the propellant gas and/or the cooling gas comprises liquid nitrogen or gaseous nitrogen which was generated immediately beforehand from liquid nitrogen.

8. The process according claim 1, comprising heating the nozzle at least sectionally to a temperature above the solidification temperature of the liquid fat.

9. The process according to claim 1, comprising heating the supply line to a temperature above the solidification temperature of the liquid fat.

10. The process according to claim 1, wherein the fat is a plant-based fat or a mixture of at least two plant-based fats.

11. The process according to claim 1, comprising subsequently mixing the particles into a food mass.

* * * * *